United States Patent [19]

Kimura et al.

[11] 4,079,113

[45] Mar. 14, 1978

[54] METHOD FOR THE PREPARATION OF FIBERS OR FILMS FROM PHENOLIC RESINS

[75] Inventors: Tomiaki Kimura, Yokohama; Masamichi Watanabe, Yokohama; Yoichiro Yamakawa, Yokohama; Seiichi Mukai, Yokohama; Kunihiro Takenaka, Machida; Masahiro Kita, Kawasaki, all of Japan

[73] Assignee: Mitsubishi Chemical Industries, Ltd., Tokyo, Japan

[21] Appl. No.: 668,141

[22] Filed: Mar. 18, 1976

[30] Foreign Application Priority Data

Oct. 21, 1975 Japan .................................. 50-126822

[51] Int. Cl.² ............................................. B29C 25/00
[52] U.S. Cl. .............................. 264/176 F; 260/59 R; 260/841; 264/236; 264/347
[58] Field of Search .............. 260/59, 841; 264/176 F, 264/236, 347

[56] References Cited

U.S. PATENT DOCUMENTS

| | | | |
|---|---|---|---|
| 3,650,102 | 3/1972 | Economy et al. | 264/176 F |
| 3,928,526 | 12/1975 | Koyama | 264/176 F |
| 3,931,386 | 1/1976 | Kimura et al. | 264/176 F |
| 3,972,959 | 8/1976 | Koyama | 264/176 F |

OTHER PUBLICATIONS

"Fast Curing Novolacs," by Dijketra et al., Am. Chem. Soc., Div. of Org. Coat. & Plastics Chem., Mar. 1966, vol. 26, No. 1, pp. 107–111.

*Primary Examiner*—Jay H. Woo
*Attorney, Agent, or Firm*—Oblon, Fisher, Spivak, McClelland & Maier

[57] ABSTRACT

Fibers or films with high mechanical strengths are produced from novolacs which are obtained by reaction of resols with phenols under neutral or acidic conditions.

13 Claims, 2 Drawing Figures

METHOD FOR THE PREPARATION OF FIBERS OR FILMS FROM PHENOLIC RESINS

BACKGROUND OF THE INVENTION

1. Field of the Invention

This invention relates to an improved method for the preparation of fibers or films with excellent mechanical strengths from phenolic resins.

2. Description of the Prior Art

There is well known a method for the preparation of fibers or films from thermoplastic novolac resins which are obtained by interacting phenols and formaldehyde under acidic conditions, in which method the novolac resins are melt spun into fibers or formed into films, and then cured by heating the fibers or films in a formaldehyde environment to obtain infusible, cured novolac fibers or films. Further, it is known that a resol which is obtained by reacting a phenol with formaldehyde in the presence of basic catalyst can be formed into a fiber by subjecting it to spinning and subsequently to a mere heat curing treatment. The fibers or films obtained from these phenolic resins have a high carbon content and a three dimensional cross-linked structure, thus being infusible and incombustible, and very excellent in chemical resistance. The phenolic fibers have been used extensively in a wide variety of fields such as of antiflaming wear, working wear, inwall clothes, tents, various kinds of filters, separators for storage battery, felts, curtains and reinforcing materials for lamination.

However, the phenolic fibers or films obtained by the conventional methods are somewhat insufficient in mechanical strength. In order to improve the mechanical strength of the phenolic resin fibers, there has been proposed a method wherein the fibers are stretched in an aqueous methanol solution and thermally set. This method is disadvantageous from a practical viewpoint in that elongation of the resultant fibers is reduced and the fibers become brittle though the mechanical strength is increased. There is accordingly a strong demand of a method for preparing phenolic fibers or films which are improved in mechanical strength and elongation without loss of other useful properties.

SUMMARY OF THE INVENTION

It is therefore an object of the present invention to provide a method for preparing phenolic fibers or films having high mechanical strength and elongation.

It is another object of the present invention to provide a method for preparing phenolic fibers or films which are high in mechanical strength and elongation, and white in color.

The above objects can be attained by a method for the preparation of phenolic fibers or films wherein a phenolic resin is subjected to a melt spinning or film-forming treatment and then cured by means of an aldehyde, the phenolic resin being a novolac which is obtained by reacting a resol with a phenol under neutral or acidic conditions.

DETAILED DESCRIPTION OF THE PREFERRED EMBODIMENTS

Figure 1:
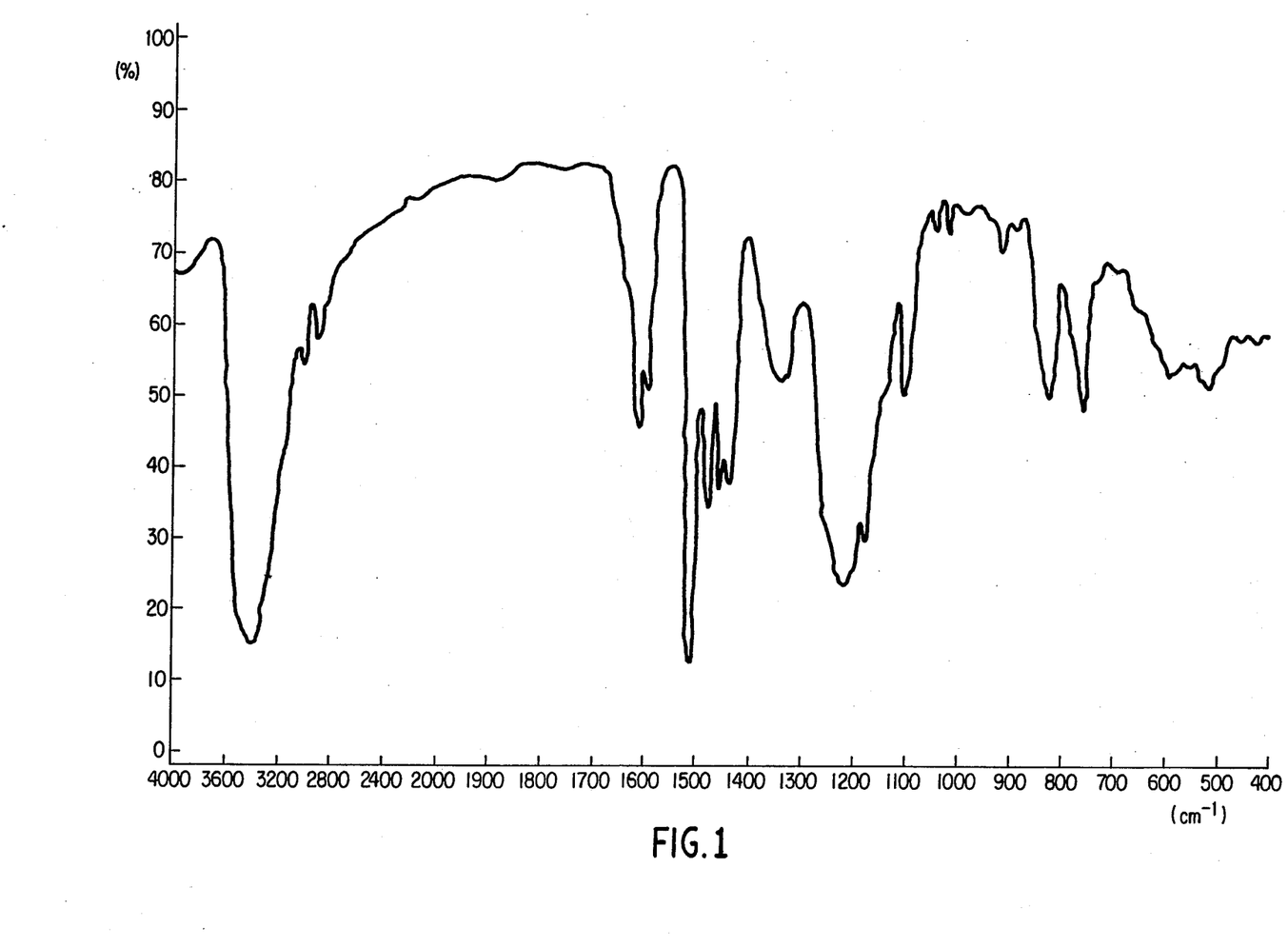
FIGS. 1 and 2 are representations of infra red spectra of novolacs 5 and 10 obtained in Example 1, respectively.
Figure 2:
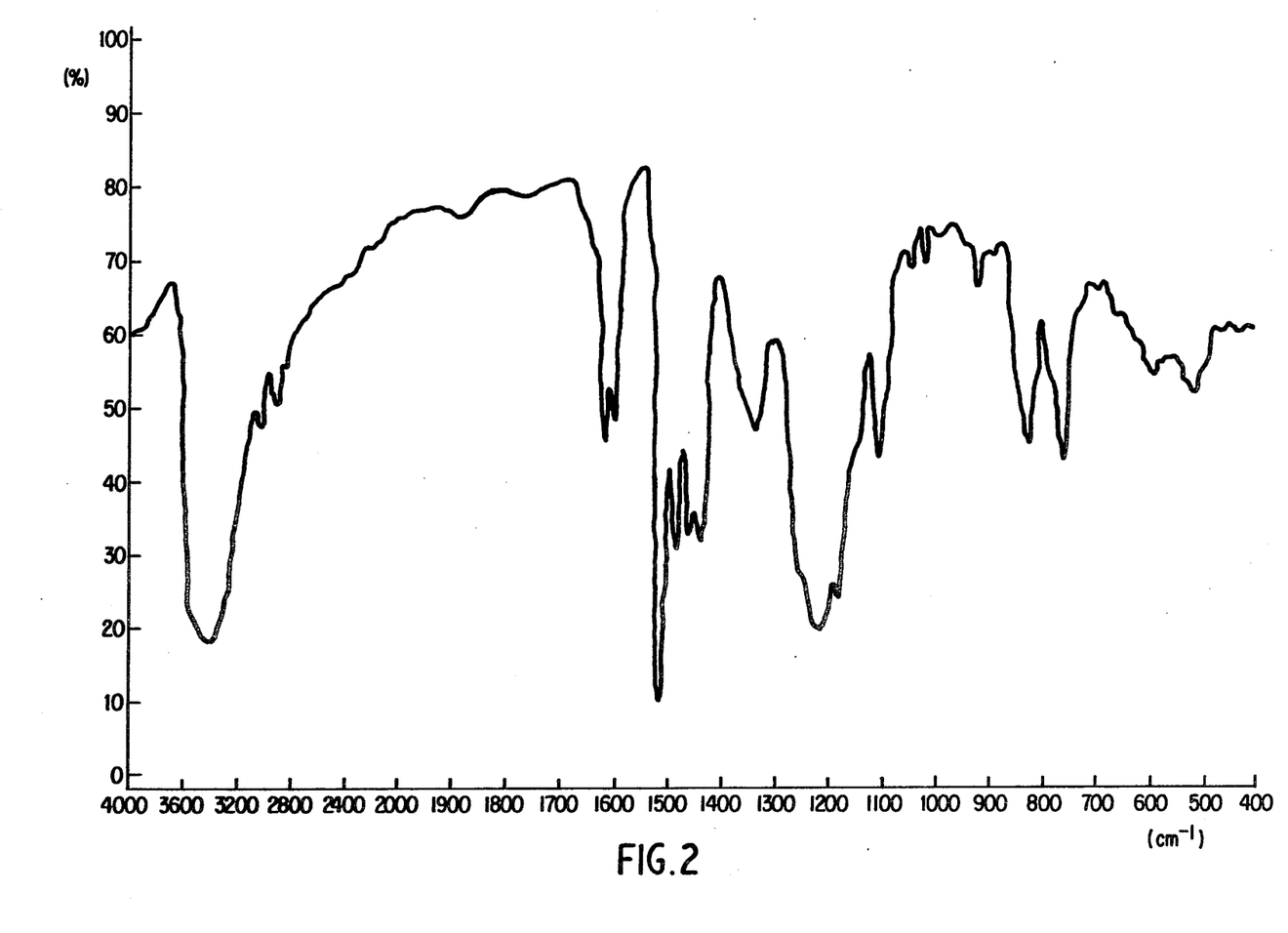

The term "resol" used herein is intended to mean a condensation product obtained by interacting an aldehyde and a phenol in the presence of a basic catalyst, i.e., a phenol alcohol having reactive methylol groups. In general, typical of the aldehyde useful in preparing a resol of the type mentioned above is formaldehyde. Apart from this, paraformaldehyde, polyoxymethylene, trioxane, furfural and the like may also be employed. These aldehydes may be used singly or in combination.

The phenols suitable for the purpose of the invention are those which contain one or more phenolic hydroxyl groups in one molecule thereof and which have three or more free sites at ortho and para positions to the phenolic hydroxyl group. In order to produce a three dimensional cross-linked structure by curing, it is necessary to use phenols which have three or more free sites at the ortho and para positions. Examples of the phenols include phenol, cresol, chlorophenol, phenylphenol, bisphenol A, phenophthalein, resorcinol, methylresorcinol, hydroquinone, naphthol, etc. These phenols may be used singly or in combination of two or more.

Further, nitrogen-containing compounds which have at least three functional groups capable of reacting with aldehydes may be added to the reaction system of aldehydes and phenols for copolymerization with the aldehydes. Examples of the nitrogen-containing compounds are aniline, N,N-dimethylaniline, melamine, cyanuric acid, urea compounds, and the like. The preparation of resols is necessary to be effected under basic conditions. Any of known substances exhibiting alkalinity may be employed without limitation. The basic substances include, for example:

Group A bases (1) hydroxides of metals of Groups 1-3 of the Periodic Table such as lithium hydroxide, potassium hydroxide, sodium hydroxide, calcium hydroxide, barium hydroxide, strontium hydroxide, aluminum hydroxide, and the like, (2) tertiary amines such as trimethylamine, triethylamine, tripropylamine, tributylamine, dimethylbenzylamine, triphenylamine and the like, (3) quaternary amines such as tetramethylammonium hydroxide, tetraethylammonium hydroxide, tetrabutylammonium hydroxide, trimethylbenzylammonium hydroxide and the like, and (4) polymeric compounds having tertiary or quaternary nitrogen atoms in the side chains, such as strongly basic ion exchange resins and the like; and Group B bases (1) ammonia, (2) primary amines such as methylamine, ethylamine propylamine, butylamine, phenylamine and the like, (3) secondary amines such as dimethylamine, diethylamine, dipropylamine, dibutylamine, diphenylamine and the like, and (4) polymeric compounds having primary or secondary nitrogen atoms in the side chains, such as weakly basic ion exchange resins and the like.

The basic substances useful in the preparation of resols can be broadly classified into two groups as indicated above. In order to achieve the method of the invention more effectively, it is preferable to use resols prepared by the use of the bases of Group A.

The reaction conditions vary depending on which bases of Group A or B are used, i.e., the kind of bases.

When the bases of Group A are used, the reaction temperature is in the range of 40° – 95° C, preferably 50° – 90° C and the amount of an aldehyde is preferred to be in the range of 1 – 4 moles per mole of a phenol. When an aldehyde is used in an amount less than 1 mole, the reaction will proceed to a considerable extent due to high activity of the bases of Group A, resulting in formation of a resol with a too high molecular weight. On the other hand, when the amount of an aldehyde exceeds 4 moles, a substantial amount of the aldehyde will unfavorably remain unreacted. The amount of the bases of Group A is generally above 0.5 mole %, preferably in the range of 0.5 – 20 mole %, to a charged phenol. The amount of the bases of Group A gives a great influence on conversion of the aldehyde. With the amount of less than 0.5 mole %, the reaction proceeds unsatisfactorily, thus it being hard to obtain a resol. While, the amount exceeding 20 mole % is not advantageous from an industrial point of view since the heat of generation is made extremely great at an initial stage of the reaction and it becomes difficult to properly control the reaction temperature.

When, on the other hand, the bases of Group B are employed, the reaction temperature is generally in the range of 40° – 100° C, preferably 60° – 100° C. The amount of an aldehyde is preferred to be in the range of 0.5 – 1 mole per mole of a phenol. In this case, the phenol is used in amount more than the aldehyde. Stated another way, the phenol required, after the preparation of the resol, for subsequent reaction with a resol under neutral or acidic conditions has been previously added to the reaction system. This is because the basic substances of Group B are rather low in catalytic activity than those of Group A and a tendency of side production of high molecular weight materials is almost independent of charging ratio of aldehyde to phenol. The addition of a phenol in excess leads to omission of a step of adding a phenol to a subsequent reaction system after the preparation of the resol.

The amount of the bases of Group B is generally in the range of 0.5 – 20 mole %, preferably 0.5 – 15 mole %, to a charged phenol. The conversion of an aldehyde is significantly influenced by the amount of the bases of Group B.

In the practice of the present invention, a high molecular weight resol is not preferable due to its tendency to gelation. In this case, it is not desirable that a resol contains high molecular weight components with a molecular weight greater than 400 in an amount exceeding 10%.

The preparation of the resol has been described in detail. The present invention is characterized in that the thus prepared resol is further subjected to reaction with a phenol under neutral or acidic conditions to obtain a novolac, the novolac being formed into fibers or films.

The resol used in the present invention means a phenol derivatives which comprises, as its principal, main or greater component, a trimethylol phenol, a trimethylol compound with two phenol nuclei, a tetramethylol compound with two phenol nuclei, or a mixture thereof. It seems reasonable to say that the novolac derived from a resol intermediate of the type mentioned above has a molecular structure different from an ordinary linear novolac, which is obtained by interacting a phenol and an aldehyde in the presence of an acid catalyst in excess of the phenol. That is, the novolac of the invention may be considered to contain a larger proportion of a branched structure than the ordinary linear novolac.

After the preparation of a resol, the reaction system is brought into neutral or acidic conditions for further reaction with a phenol to obtain a novolac. When, for example, a basic polymer, such as anion-exchange resin, which is insoluble in the reaction system is used for the preparation of a resol, it becomes possible to effect a subsequent novolac formation reaction merely by removing the polymer by filtration. In other cases, it is generally sufficient to add to the reaction system an acidic substance in an amount equivalent to or greater than that of the basic substance employed in the preparation of a resol. The pH value of the reaction system is controlled in the range of 7 – 0, preferably 3 – 0. Examples of the acidic substances include inorganic acids such as sulfuric acid, nitric acid, hydrochloric acid, phosphoric acid, perchloric acid, etc., and organic acids such as oxalic acid, malonic acid, acetic acid, maleic acid, etc. Of these, oxalic acid is most preferable due to its high catalytic activity and susceptibility to thermal decomposition.

Since salts which have been formed upon neutralization with an acid may be insoluble in a final resin product depending on the kinds of the employed bases and acids, there is sometimes required a step of removing the insoluble salt from the product. In this connection, when ammonia, a primary, secondary or tertiary amine is used as a basic substance in the preparation of resol, the salt formed by neutralization is soluble in a final resin, and the spinning or film formation is feasible without hindrance, thus the removing step being unnecessary. With the other bases, however, the salts formed by neutralization and existing in a novolac sometimes serves to impair the spinnability or film-forming property of a novolac and the fibers or films obtained after a curing treatment may be reduced in mechanical strength and elongation. Accordingly, the salts are desired to be removed by filtration or washing.

The phenols which are employable for reaction with the resol may be any of such phenols as indicated hereinbefore in the preparation of resol. A phenol may be freshly added to the reaction system either after rendering the reaction system neutral or acidic, or simultaneously with addition of an acidic substance. Alternatively, an excess of a phenol may have been previously added at the preparation stage of resol. It should be noted that the latter is particularly advantageous when the resol is prepared under such conditions that an excessive phenol gives no adverse effect on its preparation, e.g., under conditions using a base of Group B.

The molecular weight of an ultimately obtained novolac is controlled by changing a molar ratio, to an aldehyde, of a total amount of the phenols employed in the preparations of both resol and novolac. In order to achieve the purpose of the present invention, the molar ratio of a total phenol to an aldehyde is generally selected in the range of 1.1 – 2.0, preferably 1.2 – 1.6. With the molar ratio less than 1.1, once formed resol substances further react with each other, resulting in formation of high molecular weight material and also in gelation. With the ratio above 2.0, not only a large amount of unreacted phenol remains in the reaction system, but also the molecular weight of the resin product becomes too low, with the attendant low viscosity unsuitable for spinning or film-forming.

The reaction of a resol with a phenol is generally effected at a temperature of 70° – 120° C, preferably 90°

– 120° C, for 0.5 – 18 hours. The reaction takes place mainly between the methylol groups and the phenol and proceeds very rapidly. Then, the reaction system is heated for evaporation generally at a temperature of 100° – 180° C so as to make the reaction to proceed further and to remove the resultant water from the reaction system. When the removal of water by distillation almost comes to an end, unreacted phenol is expelled from the system at a temperature of 160° – 250° C under a reduced pressure of 0 – 50 mmHg to obtain a novolac to be employed in a subsequent spinning or film-forming process.

The typical preparation of novolacs of the present invention has been described hereinabove. When trimethylolphenol is used as a starting resol, it is expected that a branched novolac having the following structural formula is obtained under ideal conditions (see American Chemical Society Division of Organic Coating and Plastics Chemistry, March, 1966, Vol. 26, No-1, pages 107 – 111)

Similarly, when tetramethylol compound with two phenol nuclei is used as a starting resol, it is considered to give a branched novolac of the following structural formula Novolacs which are obtained under optimum reaction conditions in accordance with the present invention have generally a number average molecular weight of 500 – 2000 and are employable, as it is, in a melt spinning or film-forming process without any hindrance. Preferably, the number average molecular weight should be controlled in the range of 600 – 1200. When the molecular weight is less than 500, the melt spinning is made difficult since the breakage takes place during spinning operations and spun yarns tend to be adhered together due to its low melting point. While, with the molecular weight exceeding 2000, it is disadvantageous partly due to difficulty in polymerization operation for obtaining such high molecular weight resin and partly due to reductions in melt spinnability and curing reactivity.

The control of molecular weight of novolacs useful in the present invention is simply feasible by controlling preparation conditions of resol, reaction conditions of resol and novolac (particularly reaction temperature), degasing conditions under reduced pressure, or mixing of two or more kinds of novolacs with different molecular weights.

In order to improve the melt spinnability or film-forming property of a novolac, polyamides such as, for example, 6-nylon, 7-nylon, 9-nylon, 11-nylon, 12-nylon, 6,6-nylon, 6,10-nylon, 6T-nylon expressed by a general formula 11T-nylon expressed by a general formula and the like may be admixed with the novolac under molten conditions in an amount of 0.5 – 40% by weight of the novolac.

The novolac in this invention or the mixture of the novolac and a polyamide is melt spun into a fiber or formed into a film, followed by curing by a known method. That is, the fiber or film is immersed in an aqueous mixed solution of 8 –25% by weight of an acid catalyst and 8 –25% by weight of an aldehyde at a temperature of 20° – 40° C. The temperature of the solution is then gradually raised from 20° –40° C to 80° – 130° C over a period of 1 – 5 hours and maintained at the elevated temperature for 5 – 50 hours for curing (single stage curing method). Alternatively, the fiber or film can be cured by a method wherein the same is immersed in an aqueous mixed solution of 8 – 25% by weight of an acid catalyst and 8 – 25% by weight of an aldehyde, and the solution is heated to gradually elevate the temperature from 20° –40° C to 80° – 130° C over a period of 0.5 – 4 hours, and keep the elevated temperature for 0.5 – 4 hours followed by treating with an aqueous mixed solution of 0.5 – 10% by weight of a basic catalyst and 1 – 40% by weight of an aldehyde at a temperature of 70° – 120° C for 0.5 – 3 hours (double stage curing method). The aldehydes useful in the curing reaction may be those which have been employed in the preparation of resol. Preferably, formaldehyde is useful for this purpose. Examples of the acid catalysts suitable in the practice of the invention include, for example, strong acids such as hydrochloric acid, sulfuric acid, phosphoric acid, oxalic acid, hypochlorous acid, paratoluenesulfonic acid and the like. Of these, hydrochloric acid is preferable. While, examples of the basic catalysts are ammonia, sodium hydroxide, potassium hydroxide, pyridine and various kinds of amines. Of these, ammonia is most preferable.

In the above curing treatment, it is essential that the concentrations of the acid catalyst, basic catalyst and aldehyde be taken within the above ranges, respectively, and the curing temperature and time conditions as well as the concentrations of the respective components be properly selected. By this, the phenolic fibers or films with excellent mechanical strength and elongation can be obtained. When the conditions or concentrations are each below the above-defined range, it is difficult to obtain fibers or film having excellent mechanical strength and elongation since the fibers or films adhere to each other or are dissolved in the solution during the curing operations. On the other hand, use of the condition or concentrations beyond the above ranges is disadvantageous in that an aldehyde tends to precipitate and that the curing reactivity is rather lowered. In the curing treatment, it is most important that the spun novolac fibers or formed films which have been immersed in the aqueous mixed solution of the acid catalyst and aldehyde are heated in such a way as to gradually raise the temperature thereof. Immersion of the fibers or films into a high temperature aqueous mixed solution or rapid raising of temperature of the fibers or films results in adherence or opacity of fibers or films.

The cured phenolic fibers or films of the present invention are then treated with aqueous ammonia or an aqueous sodium hydroxide solution to remove the acid attached thereto by neutralization. In this connection, when the cured fibers or films are subjected to a swelling treatment with a lower alcohol, acetone or the like prior to the neutralization treatment, it is easy to remove the attached acid and basic catalysts, aldehyde and unreacted substances therefrom, with the fibers or films with high elongation being obtained. The swelling treatment is feasible by immersing the cured fibers or films in an aqueous solution of 30% by weight or more of a lower alcohol or acetone at a temperature of 30° – 70° C for several minutes.

If required, the thus treated phenolic fibers or films may be further subjected to an esterification reaction, for example, with acetic anhydride, an etherification reaction with ethylene carbonate, or an epoxidation reaction with epichlorohydrin, thereby to obtain a white phenolic fiber or film having excellent light fastness.

In general, the reactivity of the novolac which has been treated with an aqueous mixed solution of, for example, hydrochloric acid and formaldehyde decreases with an increase in a molecular weight of the novolac. So far as a molecule of the novolac is concerned, the phenol groups positioned more closely to the ends of the molecule show greater reactivity. In this sense, the novolac of the invention is considered to exhibit excellent curing reactivity since, as will be estimated from its production process, the novolac has a larger proportion of a branched structure and a shorter observed linear portion than an ordinary linear novolac, and additionally involves a number of molecular ends. Accordingly, it is believed that the phenolic fibers or films which are obtained by subjecting the novolac of the invention to melt spinning and treating the resultant fiber with an aqueous solution of a mixture, for example, of hydrochloric acid and formaldehyde have very excellent mechanical strengths and elongation.

The phenolic fibers or films of the present invention have, as mentioned above, very excellent mechanical strength without the impairment of other properties such as infusibility, incombustibility, chemical resistance and the like, and can be widely applied not only in the field of industrial materials, but also in that of inside decorations.

The novolac used in the present invention is different in infra red absorption spectra from a linear novolac obtained by a single production stage. In particular, there is observed a tendency that use of the bases of Group A results in greater ratio; an absorbance at 1480 cm$^{-1}$/an absorbance at 1440 cm$^{-1}$ (D1480/D1440) and an absorbance at 760 cm$^{-1}$/an absorbance at 820 cm$^{-1}$ (D760/D820) and use of the bases of Group B also in a greater ratio; an absorbance at 760 cm$^{-1}$/an absorbance at 820 cm$^{-1}$ than those of the linear novolac. In order to obtain fibers or films with favorite physical properties, ratios, D1480/D1440 and D760/D820, are preferred to be in ranges of 0.80 – 1.50 and 0.85 – 1.40, respectively. The absorbance ratio of the infra red absorption spectra may be considered to be characteristic of the molecular structure, especially branching stucture of novolac.

The present invention will be particularly illustrated by way of the following examples, it being understood that these examples are not intended to be limiting. In the examples, parts are by weight unless otherwise indicated.

Preparation of Resols: A-1 – A-18

To a mixture of 61 parts of phenol and 158 parts of an aqueous 37% formalin solution (formalin/phenol = 3 by molar ratio) was added sodium hydroxide in an amount of 5 mole % to the phenol, followed by reaction under heating conditions of 70° C for 3 hours to obtain resol A-1. The conversion of the formaldehyde was 73%.

The above process was repeated using various kinds and amounts of catalysts and reaction temperatures as shown in Table 1 below to obtain resols A-2 to A-18. The test results are shown in Table 1. It should be noted that the conversion of formaldehyde was determined by a hydrochloric acid-hydroxylamine method.

Table 1

| No. | catalyst kind | amount (mole % to phenol) | reaction temperature (° C) | Conversion of formaldehyde (%) |
|---|---|---|---|---|
| A-1 | sodium hydroxide | 5 | 70 | 73 |
| A-2 | " | 2 | 80 | 64 |
| A-3 | " | 1 | 98 | 55 |
| A-4 | calcium hydroxide | 5 | 70 | 75 |
| A-5 | " | 2 | 80 | 66 |
| A-6 | " | 1 | 98 | 55 |
| A-7 | trimethylamine | 15 | 70 | 65 |
| A-8 | " | 5 | 80 | 66 |
| A-9 | " | 3 | 98 | 54 |
| A-10 | triethylamine | 15 | 70 | 67 |
| A-11 | " | 5 | 80 | 68 |
| A-12 | " | 3 | 98 | 56 |
| A-13 | tetramethylammonium hydroxide | 15 | 70 | 67 |
| A-14 | " | 5 | 80 | 65 |
| A-15 | " | 3 | 98 | 55 |
| A-16 | tetraethylammonium hydroxide | 15 | 70 | 66 |
| A-17 | " | 6 | 80 | 65 |
| A-18 | " | 3 | 98 | 54 |

Preparation of Resols: B-1 – B-10

To a mixture of 150 parts of phenol and 80 parts of an aqueous 37% formalin solution (phenol/formalin = 1.4 by molar ratio) was added dimethylamine in an amount of 4 mole % to the phenol, followed by reaction under heating conditions of 70° C for 3 hours to obtain resol B-1. The conversion of formaldehyde was 47%.

The above process was repeated using various kinds and amounts of catalyst and reaction temperatures as shown in Table 2, thereby obtaining resols B-2 – B-10. The test results are summarized in Table 2 below.

Table 2

| No. | catalyst kind | amount (mole % to phenol) | Reaction temperature (° C) | conversion of formaldehyde (%) |
|---|---|---|---|---|
| B-1 | dimethylamine | 4 | 70 | 47 |
| B-2 | " | 3 | 80 | 51 |
| B-3 | " | 2 | 98 | 45 |
| B-4 | methylamine | 4 | 70 | 50 |
| B-5 | ethylamine | 4 | 70 | 48 |
| B-6 | diethylamine | 4 | 70 | 51 |
| B-7 | piperidine | 4 | 70 | 49 |

Table 2-continued

| No. | catalyst kind | amount (mole % to phenol) | Reaction temperature (° C) | conversion of formaldehyde (%) |
|---|---|---|---|---|
| B-8 | ammonia | 6 | 70 | 45 |
| B-9 | " | 5 | 98 | 50 |
| B-10 | " | 3 | 98 | 45 |

EXAMPLE 1

[Preparation of Novolacs]

190 parts of phenol and 6 parts of oxalic acid were added to each of the resols A-1 – A-18 in the acidic condition for reaction at 98° C for 2 hours, followed by washing three times with 50 parts of hot water of 80° C for removing unreacted materials, oxalic acid and its salt from the reaction mixture. Then, the reaction system was heated up to 170° C for evaporation and thermally treated for 1 hour under a maximum reduced pressure of 10 mmHg. Thus, various kinds of novolacs were obtained. These novolacs were subjected to analyses and measurements to determine viscosity, molecular weight, amount of residual phenol, ratio of absorbance of infra red spectra. The test results are shown in Table 3 below.

Table 3

| novolac No. | starting resol No. | viscosity ($\eta$) | molecular weight | amount of residual phenol (%) | ratio of absorbance of IR spectra D1480/D1440 | D760/D820 |
|---|---|---|---|---|---|---|
| 1 | A-1 | 0.069 | 830 | 0.5 | 1.21 | 1.03 |
| 2 | A-2 | 0.067 | 810 | 0.4 | 1.18 | 0.98 |
| 3 | A-3 | 0.065 | 780 | 0.4 | 1.02 | 0.90 |
| 4 | A-4 | 0.071 | 860 | 0.5 | 1.25 | 1.05 |
| 5 | A-5 | 0.068 | 820 | 0.5 | 1.20 | 1.02 |
| 6 | A-6 | 0.065 | 780 | 0.4 | 1.03 | 0.92 |
| 7 | A-7 | 0.068 | 820 | 0.4 | 1.10 | 1.04 |
| 8 | A-8 | 0.067 | 810 | 0.5 | 1.12 | 1.05 |
| 9 | A-9 | 0.065 | 780 | 0.4 | 1.05 | 1.00 |
| 10 | A-10 | 0.070 | 850 | 0.4 | 1.13 | 1.03 |
| 11 | A-11 | 0.068 | 820 | 0.4 | 1.15 | 1.10 |
| 12 | A-12 | 0.065 | 780 | 0.4 | 1.06 | 1.02 |
| 13 | A-13 | 0.069 | 830 | 0.5 | 1.15 | 1.10 |
| 14 | A-14 | 0.068 | 820 | 0.4 | 1.13 | 1.05 |
| 15 | A-15 | 0.065 | 780 | 0.3 | 1.00 | 0.98 |
| 16 | A-16 | 0.070 | 850 | 0.6 | 1.17 | 1.13 |
| 17 | A-17 | 0.068 | 820 | 0.4 | 1.14 | 1.10 |
| 18 | A-18 | 0.064 | 770 | 0.3 | 1.01 | 1.00 |

The respective properties shown in Table 3 were measured by the following methods:

1. The viscosity was determined as intrinsic viscosity at 30° C in a dimethylformamide solution.
2. The molecular weight was measured by the use of a vapor pressure osmometer.
3. The residual phenol percentage was determined by a gas chromatography.
4. The ratios, D760/D820 and D1480/D1440 were calculated from the infra red spectrograms of the respective novolacs obtained by a KBr method using absorbances at 760 cm$^{-1}$ and 820 cm$^{-1}$ and at 1480 cm$^{-1}$ and 1440 cm$^{-1}$, respectively.

[Preparation of Fibers]

The thus obtained novolacs 1 – 18 were each subjected to a melt spinning treatment using a nozzle with the number of starts (hole) of 30 and an aperture of 0.25 mm$\phi$, in which treatment the novolac was heated to 135° – 160° C and the resulting melt was drawn into a fiber at a winding rate of 500 m/min. Then, various kinds of the resulting novolac fibers were each immersed at 35° C in an aqueous solution containing 17.5% by weight of hydrochloric acid and 17.5% by weight of formaldehyde. The temperature of the solution was then raised gradually from 35° C to 100° C over a period of 2 hours and maintained at a temperature of 98° – 102° C for 10 hours. The resultant cured fibers were, respectively, treated with an aqueous solution containing 2.0% by weight of ammonia and 50% by weight of methanol at a temperature of 60° C for 60 minutes, followed by washing with water and drying (single curing method).

The fineness, breaking tenacity, and breaking elongation of the cured phenolic fibers were determined, with the results being shown in Table 4 below.

Table 4

| Test No. | employed novolac | properties of fibers | | |
|---|---|---|---|---|
| | | fineness (d) | breaking tenacity (g/d) | breaking elongation (%) |
| | novolac | | | |
| 1 | 1 | 2.1 | 2.1 | 57 |
| 2 | 2 | 2.2 | 2.0 | 53 |
| 3 | 3 | 2.1 | 2.0 | 54 |
| 4 | 4 | 2.2 | 2.2 | 57 |
| 5 | 5 | 2.0 | 2.0 | 53 |
| 6 | 6 | 2.0 | 1.9 | 51 |
| 7 | 7 | 2.2 | 1.9 | 52 |
| 8 | 8 | 2.3 | 1.9 | 50 |
| 9 | 9 | 2.1 | 2.1 | 57 |
| 10 | 10 | 2.0 | 2.0 | 52 |
| 11 | 11 | 2.2 | 2.0 | 55 |
| 12 | 12 | 2.1 | 1.9 | 50 |
| 13 | 13 | 2.0 | 2.1 | 56 |
| 14 | 14 | 2.0 | 2.1 | 57 |
| 15 | 15 | 2.0 | 1.8 | 50 |
| 16 | 16 | 2.1 | 2.0 | 53 |
| 17 | 17 | 2.2 | 2.1 | 58 |
| 18 | 18 | 2.3 | 1.9 | 51 |

The properties in the Table were determined as follows.

(1) Breaking tenacity: A 2 cm long sample fiber was pulled at a rate of 20 mm/min and a load exerted on the fiber at its breakage were determined as breaking tenacity. (Ultimate tenacity)
(2) Breaking elongation: A similar test was effected and an increment by elongation of the fiber at its breakage was expressed in terms of percentage of elongation to the original fiber length.

EXAMPLE 2

[Preparation of Novolacs]

To each of the resols B-1 – B-10 was added 30 parts of an aqueous 10% oxalic acid solution to render it acidic and the reaction was effected at 98° C for 2 hours. The resultant reaction products were each heated for evaporation until the temperature of the reaction system reached 170° C, and further thermally treated for 1 hour under a maximum reduced pressure of 10 mmHg to obtain novolacs. The properties of the respective novolacs were determined in the same manner as in Example 1, with the results being shown in Table 5 below.

Table 5

| novolac No. | starting resol No. | viscosity ($\eta$) | molecular weight | residual phenol (%) | ratio of absorbance of infra red spectra | |
|---|---|---|---|---|---|---|
| | | | | | D1480/D1440 | D760/D820 |
| 19 | B-1 | 0.072 | 870 | 0.5 | 0.87 | 1.05 |
| 20 | B-2 | 0.073 | 880 | 0.4 | 0.88 | 1.10 |
| 21 | B-3 | 0.071 | 860 | 0.4 | 0.82 | 1.02 |
| 22 | B-4 | 0.073 | 880 | 0.6 | 0.86 | 1.08 |
| 23 | B-5 | 0.071 | 860 | 0.4 | 0.87 | 1.06 |
| 24 | B-6 | 0.072 | 870 | 0.4 | 0.82 | 1.05 |
| 25 | B-7 | 0.072 | 870 | 0.4 | 0.76 | 1.05 |
| 26 | B-8 | 0.074 | 890 | 0.5 | 0.84 | 1.08 |
| 27 | B-9 | 0.076 | 920 | 0.4 | 0.82 | 1.13 |
| 28 | B-10 | 0.073 | 880 | 0.3 | 0.80 | 1.02 |

[Preparation of Fibers]

The novolacs 19 – 29 thus obtained were subjected to melt spinning and then curing treatments in the same manner as in Example 1. The properties of the resultant cured novolac fibers were determined similarly to Example 1, with the results being shown in Table 6 below.

Table 6

| test No. | employed novolac | properties of fibers | | |
|---|---|---|---|---|
| | | fineness (d) | breaking tenacity (g/d) | breaking elongation (%) |
| | novolac | | | |
| 19 | 19 | 2.3 | 2.0 | 54 |
| 20 | 20 | 2.1 | 2.1 | 55 |
| 21 | 21 | 2.0 | 2.0 | 53 |
| 22 | 22 | 2.2 | 2.0 | 55 |
| 23 | 23 | 2.1 | 2.2 | 57 |
| 24 | 24 | 2.1 | 2.2 | 58 |
| 25 | 25 | 2.3 | 2.0 | 54 |
| 26 | 26 | 2.2 | 2.1 | 55 |
| 27 | 27 | 2.2 | 2.1 | 59 |
| 28 | 28 | 2.1 | 2.1 | 56 |

COMPARATIVE EXAMPLE 1

[Preparation of Novolac]

150 parts of phenol, 105 parts of an aqueous 37% formalin solution and 7.5 parts of an aqueous 10% oxalic acid solution were mixed with each other for reaction at 98° C for 4 hours. The reaction mixture was heated for evaporation until the temperature of the reaction system reached 170° C, and further thermally treated for 1 hour under a maximum reduced pressure of 10 mmHg to obtain a linear novolac. The properties of the novolac were determined in the same manner as in Example 1, with results being shown in Table 7.

[Preparation of Fiber]

The thus obtained linear novolac was melt spinned and cured to obtain a cured novolac fiber and the properties of the thus obtained fiber was determined in the same manner as in Example 1. The test result are also shown in Table 7 below.

Table 7

| Test No. | | 29 |
|---|---|---|
| employed novolac | | linear novolac |
| viscosity ($\eta$) | | 0.074 |
| molecular weight | | 890 |
| residual phenol (%) | | 0.5 |
| ratio of absorbance | D1480/D1440 | 0.76 |
| of infra red spectra | D760/D820 | 0.75 |
| properties of fiber | fineness (d) | 2.0 |
| | breaking tenacity (g/d) | 1.4 |

Table 7-continued

| Test No. | 29 |
|---|---|
| breaking elongation (%) | 46 |

As will be understood from the comparison between the data of Tables 4 and 6 and those of Table 7, the fiber obtained from the conventional linear novolac is inferior in tenacity and elongation to those of the novolacs of the present invention.

EXAMPLE 3

[Preparation of Novolac]

The novolacs 1 – 18 were prepared in the same manner as in Example 1.

[Preparation of Fibers]

The thus prepared novolacs were each subjected to melt spinning and then curing treatments in the same manner as in Example 1 except maintaining at a temperature of 98° – 102° C for 20 hours. The properties of the resultant cured novolac fibers were determined similarly to Example 1, with the results being shown in Table 8.

Table 8

| Test No. | employed novolac | properties of fibers | | |
|---|---|---|---|---|
| | | fineness (d) | breaking tenacity (g/d) | breaking elongation (%) |
| | novolac | | | |
| 30 | 1 | 2.1 | 2.3 | 53 |
| 31 | 2 | 2.2 | 2.2 | 49 |
| 32 | 3 | 2.1 | 2.2 | 51 |
| 33 | 4 | 2.2 | 2.4 | 56 |
| 34 | 5 | 2.0 | 2.2 | 50 |
| 35 | 6 | 2.0 | 2.1 | 48 |
| 36 | 7 | 2.2 | 2.1 | 50 |
| 37 | 8 | 2.3 | 2.1 | 49 |
| 38 | 9 | 2.1 | 2.3 | 54 |
| 39 | 10 | 2.0 | 2.2 | 51 |
| 40 | 11 | 2.2 | 2.2 | 52 |
| 41 | 12 | 2.1 | 2.1 | 50 |
| 42 | 13 | 2.0 | 2.3 | 54 |
| 43 | 14 | 2.0 | 2.3 | 57 |
| 44 | 15 | 2.0 | 2.0 | 51 |
| 45 | 16 | 2.1 | 2.2 | 50 |
| 46 | 17 | 2.2 | 2.3 | 54 |
| 47 | 18 | 2.3 | 2.1 | 51 |

Example 4

[Preparation Of Novolac]

The novolacs 1 – 18 were prepared in the same manner as in Example 1.

[Preparation Of Fibers]

The thus prepared novolacs were each subjected to melt spinning and then curing treatments in the same manner as in Example 1 except maintaining at a temperature of 98° – 102° C for 30 hours. The properties of the resultant cured novolac fibers were determined similarly to Example 1, with the results being shown in Table 9.

Table 9

| Test No. | employed novolac | properties of fibers | | |
|---|---|---|---|---|
| | | fineness (d) | breaking tenacity (g/d) | breaking elongation (%) |
| | novolac | | | |
| 48 | 1 | 2.1 | 2.5 | 49 |
| 49 | 2 | 2.2 | 2.5 | 50 |
| 50 | 3 | 2.1 | 2.3 | 48 |
| 51 | 4 | 2.2 | 2.4 | 48 |
| 52 | 5 | 2.0 | 2.4 | 46 |
| 53 | 6 | 2.0 | 2.6 | 51 |
| 54 | 7 | 2.2 | 2.3 | 47 |
| 55 | 8 | 2.3 | 3.4 | 46 |
| 56 | 9 | 2.1 | 2.4 | 46 |
| 57 | 10 | 2.0 | 2.2 | 44 |
| 58 | 11 | 2.2 | 2.3 | 48 |
| 59 | 12 | 2.1 | 2.2 | 43 |
| 60 | 13 | 2.0 | 2.4 | 49 |
| 61 | 14 | 2.0 | 2.2 | 42 |
| 62 | 15 | 2.0 | 2.4 | 44 |
| 63 | 16 | 2.1 | 2.4 | 47 |
| 64 | 17 | 2.2 | 2.3 | 45 |
| 65 | 18 | 2.3 | 2.4 | 47 |

EXAMPLE 5

[Preparation Of Novolac]

The novolacs 19 – 28 were prepared in the same manner as in Example 2.

[Preparation Of Fibers]

The thus prepared novolacs were each subjected to melt spinning and then curing treatments in the same manner as in Example 1 except maintaining at a temperature of 98° – 102° C for 20 hours. The properties of the resultant cured novolac fibers were determined similarly to Example 1, with the results being shown in Table 10.

Table 10

| Test No. | employed novolac | properties of fibers | | |
|---|---|---|---|---|
| | | fineness (d) | breaking tenacity (g/d) | breaking elongation (%) |
| | novolac | | | |
| 66 | 19 | 2.1 | 2.2 | 49 |
| 67 | 20 | 2.2 | 2.3 | 52 |
| 68 | 21 | 2.1 | 2.2 | 50 |
| 69 | 22 | 2.1 | 2.1 | 47 |
| 70 | 23 | 2.0 | 2.3 | 51 |
| 71 | 24 | 2.2 | 2.2 | 50 |
| 72 | 25 | 2.0 | 2.2 | 48 |
| 73 | 26 | 2.0 | 2.1 | 47 |
| 74 | 27 | 2.1 | 2.2 | 50 |
| 75 | 28 | 2.1 | 2.2 | 49 |

EXAMPLE 6

[Preparation Of Novolacs]

The novolacs 1 – 18 were prepared in the same manner as in Example 1.

[Preparation Of Fibers]

The thus prepared novolacs were each melt spinned into a fiber in the same manner as in Example 1. Then, the respective fibers were subjected to a double stage curing treatment under the following conditions.

First stage curing treatment: The uncured fiber obtained by the melt spinning was immersed in an aqueous solution containing 15% by weight of hydrochloric acid and 14% by weight of formaldehyde and the temperature of the solution was raised gradually from room temperature to 98° C over a period of 3 hours and maintained at 98° C for 3 hours.

Second stage curing treatment: The fiber obtained after completion of the first stage treatment was washed with water and then treated with an aqueous solution of 3% by weight of ammonia and 15% by weight of formaldehyde at 90° C for 1 hour. The thus treated fiber was washed with water and further treated with an aqueous 55% methanol solution at 65° C for 1 hour, followed by washing with water and drying at 80° C for 45 min to obtained a cured fiber.

The cured phenolic fibers obtained by the double stage curing method were, respectively subjected to determinations of fineness, breaking tenacity and breaking elongation in a manner similar to Example 1. The test results are shown in Table 11 below.

Table 11

| Test No. | employed novolac | properties of fibers | | |
|---|---|---|---|---|
| | | fineness (d) | breaking tenacity (g/d) | breaking elongation (%) |
| | novolac | | | |
| 76 | 1 | 1.8 | 2.2 | 78 |
| 77 | 2 | 1.9 | 2.1 | 75 |
| 78 | 3 | 1.9 | 1.8 | 68 |
| 79 | 4 | 1.8 | 2.3 | 81 |
| 80 | 5 | 1.9 | 2.1 | 77 |
| 81 | 6 | 1.9 | 1.8 | 67 |
| 82 | 7 | 2.1 | 1.9 | 71 |
| 83 | 8 | 2.0 | 2.0 | 72 |
| 84 | 9 | 2.0 | 1.7 | 66 |
| 85 | 10 | 1.9 | 2.0 | 72 |
| 86 | 11 | 2.1 | 2.0 | 75 |
| 87 | 12 | 2.1 | 1.8 | 67 |
| 88 | 13 | 2.1 | 2.0 | 71 |
| 89 | 14 | 2.0 | 2.1 | 73 |
| 90 | 15 | 2.0 | 1.8 | 68 |
| 91 | 16 | 2.0 | 2.0 | 72 |
| 92 | 17 | 2.0 | 2.0 | 70 |
| 93 | 18 | 1.9 | 1.8 | 67 |

EXAMPLE 7

[Preparation Of Novolacs]

The novolacs 19 – 28 were prepared in the same manner as in Example 2.

[Preparation Of Fibers]

The thus prepared novolacs were each subjected to melt spinning and then curing treatments in the same manner as in Example 6 to obtain cured fibers. The properties of the respective cured fibers were determined in the same manner as in Example 1, with the results being shown in Table 12 below.

Table 12

| Test No. | employed novolac | properties of fibers | | |
|---|---|---|---|---|
| | | fineness (d) | breaking tenacity (g/d) | breaking elongation (%) |
| | novolac | | | |
| 94 | 19 | 2.1 | 1.8 | 75 |
| 95 | 20 | 2.0 | 1.8 | 77 |
| 96 | 21 | 2.0 | 1.8 | 76 |
| 97 | 22 | 1.9 | 1.7 | 74 |
| 98 | 23 | 2.1 | 1.8 | 75 |
| 99 | 24 | 2.0 | 1.8 | 76 |
| 100 | 25 | 1.9 | 1.8 | 76 |
| 101 | 26 | 2.0 | 2.1 | 80 |
| 102 | 27 | 1.9 | 1.8 | 74 |
| 103 | 28 | 1.8 | 1.8 | 76 |

COMPARATIVE EXAMPLE 2

A linear novolac was prepared in the same manner as in Comparative Example 1 and was then subjected to melt spinning and curing treatments in the same manner as in Example 6 to obtain a cured fiber. The properties of the thus obtained cured fiber were determined similarly to the case of Example 1. The test results are shown in Table 13 below.

Table 13

| Test No. | | 104 |
|---|---|---|
| employed novolac | | linear novolac |
| properties of fiber | fineness (d) | 2.0 |
| | breaking tenacity (g/d) | 1.5 |
| | breaking elongation (%) | 66 |

As will be clear from the comparison between the test data of Tables 11 and 12 and those of Table 13, the fiber obtained from the conventional linear novolac is inferior in mechanical strengths and elongation to those of the novolacs of the invention.

EXAMPLE 8

[Preparation Of Novolacs]

The novolacs 1 - 3 and 19 - 21 were prepared in the same manner as in Examples 1 and 2.

[Preparation Of Fibers]

90 g of each of the thus prepared novolacs was mixed with 10 g of 12-nylon under molten conditions, followed by melt spinning at 165° C at a winding rate of 1200 m/min by the use of a nozzle with the number of starts of 18 and an aperture of 0.20 mm $\phi$. The properties of the resultant of novolac fibers were determined similarly to the case of Example 1, with the following results. The breaking strength ranged from 0.51 to 0.55 g/d and the break elongation ranged from 11.5 to 13.8%. Then, the respective spun fibers were preliminarily cured in an aqueous solution containing 12.5% by weight of hydrochloric acid, 10.0% by weight of orthophosphoric acid and 14.5% by weight of formaldehyde at a temperature of 39° - 42° C for 30 min, at 54° - 57° C for 30 min, at 74° - 77° C for 30 min and finally at 98° - 100° C for 30 min. After washing with water, the preliminarily cured fibers were each completely cured in an aqueous solution containing 2% by weight of ammonia and 20% by weight of formaldehyde at 95° - 97° C for 60 min. The resulting cured novolac fibers were washed with water and treated with 3 wt % aqueous ammonia at 75° C for 5 hours, followed by washing with water and drying. The properties of the cured fibers were determined in the same manner as in Example 1, with the results being shown in Table 14 below.

For comparative purpose, the linear novolac of Comparative Example 1 was also mixed with 12-nylon and subjected to melt spinning and curing treatments in a manner as described above. The properties of the resulting cured fiber were also determined. The results are also shown in Table 14.

Table 14

| | | properties of fibers | | |
|---|---|---|---|---|
| Test No. | employed novolac | fineness (d) | breaking tenacity (g/d) | breaking elongation (%) |
| | novolac | | | |
| 105 | 1 | 2.2 | 2.4 | 51 |
| 106 | 2 | 2.3 | 2.4 | 52 |
| 107 | 3 | 2.1 | 2.3 | 49 |
| 108 | 19 | 2.2 | 2.1 | 46 |
| 109 | 20 | 2.4 | 2.0 | 44 |
| 110 | 21 | 2.2 | 2.1 | 45 |
| 111 | linear novolac | 2.2 | 1.4 | 36 |

As will be clearly understood from Table 14, the fibers of the invention prepared from the novolacs mixed with 12-nylon are superior in mechanical strengths and elongation to that obtained from the conventional linear novolac mixed also with 12-nylon.

EXAMPLE 9

[Preparation Of Novolacs]

The novolacs 1 - 5 and 19 - 23 were prepared in the same manner as in Examples 1 and 2.

[Preparation Of Fibers]

The thus prepared novolacs were subjected to a melt spinning treatment in the same manner as in Example 1 to obtain fibers, respectively. The fibers were each immersed at 30° C in an aqueous solution containing 16.5% by weight of hydrochloric acid and 14.5 % by weight of formaldehyde. The temperature of the solution was gradually raised from 30° C to 98° C over a period of 3 hours and then maintained at 97° - 99° C for further 3 hours. After washing with water, the thus immersed fibers were each treated with an aqueous solution containing 2.5% by weight of ammonia and 15.0% by weight of formaldehyde at 80° - 82° C for 90 min. The resulting cured fibers were further immersed at 55° C for 90 min in an aqueous solution of 58% by weight of ethanol the pH of which was adjusted to 7 - 8 by means of aqueous ammonia. The properties of the phenol or novolac fibers were determined, with the results being shown in Table 15.

Then, the novolac fibers were each subjected to an acetylation reaction at 120° C for 60 min in a mixed solution of 65% by weight of acetic anhydride, 33% by weight of acetic acid and 2% by weight of orthophosphoric acid to obtain an acetylated phenol fiber. The acetylated fibers were white in color. The properties of the acetylated fibers are shown in Table 15.

For comparison, the linear novolac of Comparative Example 1 was melt spinned, cured and acetylated (or bleached) in the same manner as described above. The properties of acetylated linear phenol fiber are also shown in Table 15 below.

Table 15

| | | properties of fibers | | | | | |
|---|---|---|---|---|---|---|---|
| | | phenol fibers | | | acetylated phenol fibers | | |
| Test No. | employed novolac | fineness (d) | breaking tenacity (g/d) | breaking elongation (%) | fineness (d) | breaking tenacity (g/d) | breaking elongation (%) |
| | novolac | | | | | | |
| 112 | 1 | 2.1 | 2.3 | 79 | 2.5 | 1.7 | 46 |
| 113 | 2 | 2.2 | 2.3 | 79 | 2.6 | 1.8 | 49 |
| 114 | 3 | 2.0 | 2.3 | 78 | 2.6 | 1.7 | 42 |
| 115 | 4 | 2.0 | 2.2 | 78 | 2.6 | 1.7 | 43 |
| 116 | 5 | 2.2 | 2.1 | 73 | 2.5 | 1.7 | 45 |
| 117 | 19 | 2.2 | 2.0 | 70 | 2.4 | 1.6 | 41 |
| 118 | 20 | 2.1 | 2.0 | 71 | 2.4 | 1.6 | 41 |
| 119 | 21 | 2.2 | 2.1 | 73 | 2.5 | 1.7 | 47 |
| 120 | 22 | 2.1 | 2.1 | 75 | 2.5 | 1.7 | 47 |
| 121 | 23 | 2.1 | 2.1 | 73 | 2.5 | 1.7 | 42 |
| 122 | linear | 2.1 | 1.5 | 55 | 2.5 | 1.3 | 31 |

Table 15-continued

| Test No. | employed novolac | properties of fibers | | | | | |
|---|---|---|---|---|---|---|---|
| | | phenol fibers | | | acetylated phenol fibers | | |
| | | fineness (d) | breaking tenacity (g/d) | breaking elongation (%) | fineness (d) | breaking tenacity (g/d) | breaking elongation (%) |
| | novolac | | | | | | |

As will be clear from the results of Table 15, the white acetylated phenol fibers obtained from the novolacs of the invention are slightly reduced in strength and elongation when compared with the non-acetylated fibers, but are superior to the acetylated linear novolac fiber.

REFERENCE EXAMPLE

The cured phenol fibers of test Nos. 1 – 3 and 19 – 21 of Examples 1 and 2, respectively, and of Comparative Example 1 were each formed into a spinning yarn with a single yarn number count of 20. The properties of the respective spinning yarns were determined. The test results are shown in Table 16 below.

Table 16

| employed fibers | properties of spinning yarns | | |
|---|---|---|---|
| | breaking strength (g) | breaking elongation (%) | L.O.I. value (%) |
| Test No. 1 | 311 | 11.4 | 31.9 |
| 2 | 325 | 11.8 | 31.5 |
| 3 | 305 | 11.2 | 32.1 |
| 19 | 296 | 10.6 | 30.9 |
| 20 | 302 | 10.8 | 31.8 |
| 21 | 289 | 10.1 | 31.5 |
| Comparative Example 1 (test No. 29) | 185 | 3.2 | 31.8 |

The properties in the Table were measured as followed: the breaking strength was measured by a method as prescribed in JIS-L 1074; the breaking elongation also by the method as in JIS-L 1074; and the L.O.I. (Limiting Oxygen Index) value by a method as prescribed in JIS-K 7201. Though the phenol fibers obtained by the method of the invention have excellent mechanical strengths and elongation even in the form of a single yarn as stated hereinbefore, the excellency is more pronounced in the form of spinning yarns as will be clear from the results of Table 16.

What is claimed is:

1. In a method for the preparation of a phenolic fiber or film which comprises subjecting a phenolic resin to a melt spinning or melt-forming treatment, and curing the resulting fiber or film by means of an aldehyde, the improvement which comprises: providing as said phenolic resin a novolac having a molecular weight ranging from 500 to 2000 which is obtained by reacting a resol prepared by reacting a phenol and an aldehyde in the presence of ammonia or a primary, secondary or tertiary amine as a catalyst with a phenol under neutral or acidic conditions, wherein said neutral or acidic conditions are attained with oxalic acid.

2. The method according to claim 1, wherein the amount of said ammonia or amine catalyst is in the range of 0.5 to 20 mole % to said phenol.

3. The method according to claim 1, wherein the interaction is effected at a temperature of 40° to 100° C.

4. The method according to claim 1, wherein the solution conditions are acid.

5. The method according to claim 1, wherein the reaction between said resol and said phenol is effected at a temperature of 70° to 120° C.

6. The method according to claim 1, wherein said aldehyde is formaldehyde.

7. The method according to claim 1, wherein said fiber or film is cured by heating said fiber or film with said aldehyde in the presence of an acid catalyst.

8. The method according to claim 7, wherein said acid catalyst for said curing reaction is hydrochloric acid.

9. The method according to claim 7, wherein said curing is effected by heating said fiber or film from 20° – 40° C to 80° – 130° over a period of 1 to 5 hours and maintained at the elevated temperature for 5 to 50 hours.

10. The method according to claim 1, wherein said curing by said aldehyde is effected in two stages wherein said fiber or film is first heated in the presence of an acid catalyst and then heated in the presence of a basic catalyst.

11. The method according to claim 10, wherein the first stage heating in the presence of said acid catalyst is conducted by raising the temperature of the fiber or film from 20° – 40° C to 80° – 130° C over a period of 0.5 to 4 hours and keeping the elevated temperature for 0.5 to 4 hours and the second stage heating in the presence of said basic catalyst is conducted by keeping the film or fiber at 70° to 120° C for 0.5 to 3 hours.

12. In a method for the preparation of a phenolic fiber or film which comprises subjecting a phenolic resin to a melt spinning or film-forming treatment and curing the resulting fiber or film by means of an aldehyde, the improvement which comprises: providing as said phenolic resin a mixture containing (1) a novolac having a molecular weight ranging from 500 to 2000 obtained by reacting a resol prepared by reacting a phenol and an aldehyde in the presence of ammonia or a primary, secondary or tertiary amine as a catalyst with a phenol under a neutral or acidic conditions, wherein said neutral or acidic conditions are attained with oxalic acid and (2) a polyamide in an amount of 0.5 to 40% by weight of novolac.

13. In a method for the preparation of a phenolic fiber or film which comprises subjecting a phenolic resin to a melt spinning or film-forming treatment and curing the resulting fiber or film by means of an aldehyde, the improvement which comprises: providing as said phenolic resin a novolac having a molecular weight ranging from 500 to 2000 obtained by reacting a resol prepared by reacting a phenol and an aldehyde in the presence of ammonia or a primary, secondary or tertiary amine as a catalyst with a phenol under neutral or acidic conditions, wherein said neutral or acidic conditions are attained with oxalic acid, and subjecting the cured fiber or film to a treatment which blocks phenolic hydroxyl groups of the novolac by esterification or etherification.

* * * * *

UNITED STATES PATENT AND TRADEMARK OFFICE
CERTIFICATE OF CORRECTION

PATENT NO. : 4,079,113
DATED : March 14, 1978
INVENTOR(S) : TOMIAKI KIMURA, ET AL It is certified that error appears in the above-identified patent and that said Letters Patent are hereby corrected as shown below:

Claim 1, line 3, delete "melt-forming" and insert

--film-forming--;

Signed and Sealed this

Twenty-fourth Day of April 1979

[SEAL]

Attest:

RUTH C. MASON
Attesting Officer

DONALD W. BANNER
Commissioner of Patents and Trademarks